(12) United States Patent
Yang

(10) Patent No.: US 6,806,679 B2
(45) Date of Patent: Oct. 19, 2004

(54) LOW INTERNAL IMPEDANCE CURRENT POOL FOR A CHARGING/DISCHARGING DEVICE

(76) Inventor: Tai-Her Yang, No. 59, Chung Hsing 8 St., Siu-Hu Town, Dzan-Hwa (TW)

(*) Notice: Subject to any disclaimer, the term of this patent is extended or adjusted under 35 U.S.C. 154(b) by 228 days.

(21) Appl. No.: 09/884,031

(22) Filed: Jun. 20, 2001

(65) Prior Publication Data
US 2002/0195990 A1 Dec. 26, 2002

(51) Int. Cl.⁷ .................................................. H02J 7/00
(52) U.S. Cl. ..................................... 320/107; 320/112
(58) Field of Search ................................ 320/107, 112, 320/115, 116, 138; 429/97, 98, 99, 100; 363/71, 40, 20

(56) References Cited
U.S. PATENT DOCUMENTS 4,651,080 A * 3/1987 Wallace ...................... 320/101
4,951,255 A * 8/1990 Hobbs ......................... 365/207

* cited by examiner

Primary Examiner—Lawrence Luk
(74) Attorney, Agent, or Firm—Bacon & Thomas, PLLC

(57) ABSTRACT

Storage/discharge device integral with a low impedance current pool compartment is meant for application in common primary cell or secondary rechargeable cell or fuel cell, or still in a capacitor or super capacitor, otherwise similar charging/discharging device, and the electrode boards feature one or more current pool means to yield multiple confluent current paths, characterized in that by connecting in parallel current pool terminals of identical voltage rating and of electrode boards of like polarities from tanks of like polarities or from tanks of dissimilar polarities, or alternatively by series connection or compound serial/parallel combination of current pool terminals way between electrode boards of dissimilar polarities a low impedance structure for input/output current pool is achieved on the exteriority of the positive or negative polarity electrode boards on both sides of individually installed electrode tanks.

26 Claims, 18 Drawing Sheets

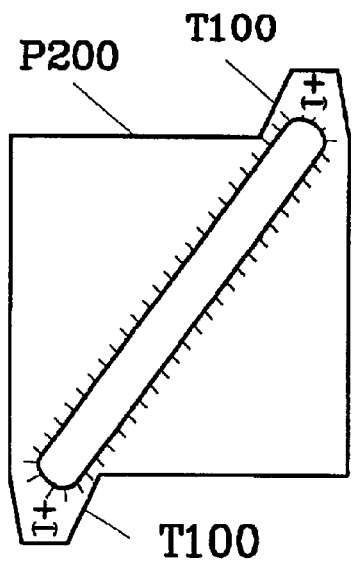 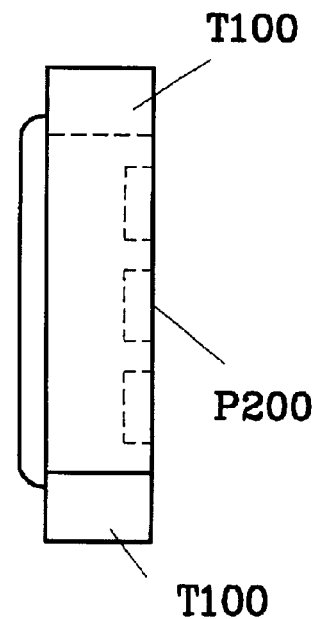
FIG. 11  FIG. 12
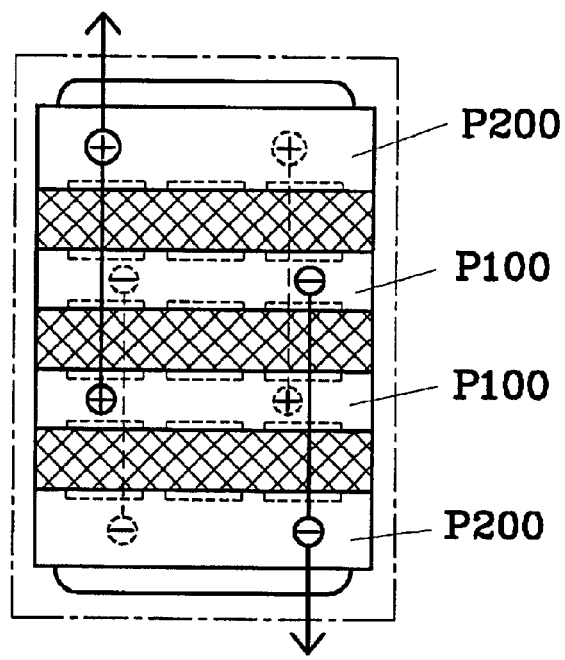
FIG. 13

LOW INTERNAL IMPEDANCE CURRENT POOL FOR A CHARGING/DISCHARGING DEVICE

BACKGROUND OF THE INVENTION (a) Field of the Invention

The present Charging/Discharging Device featuring as executed on the exterior side of the electrode board, of positive or negative polarity, on both sides of the individually installed electrode tank, a low resistance current pool structure of any chosen geometry to facilitate infeeding/outfeeding of confluent currents, executed in the form of inflowing/effluent pooling terminals, or that incorporated with parallel current pool conductor, or as made from material of better conductivity with a view to reduce the resistance to infeeding/outfeeding confluent currents.

(b) Description of the Prior Art

With a conventional Charging/Discharging Device, any primary or secondary rechargeable cell, or fuel cell, or still a capacitor or super capacitor or otherwise electricity storage or discharge device, for example, such as the unilaterally installed current pool terminal electrode board, of a prior art, illustrated in FIG. 1, the idea is to have a current pool terminal T100 installed on one side of each electrode board P100, meant to converge outfeeding or infeeding currents, or alternatively to serve as a serial or parallel conjunction point for communication with other electrodes, as with such executions there is but one side instead of both on the electrode board where infeeding or outfeeding current transits, what follows inevitably on the electrode boards when larger currents were transiting as input or output is want of uniformity of current density on portions of electrode board adjacent to the current pool terminals and on portions of electrode remote from the current pool terminal T100, since this is a one-way current path, the internal impedance is necessarily larger; furthermore, the previous U.S. Pat. Nos. 6,159,633, 6,174,619 and 6,531,247 granted to the same inventor disclosed a common feature to have current pool terminals provided on two or more than two current pool terminals on electrode boards of like polarities and of identical voltage specifications, disposed in a tank of like electrodes or dissimilar electrodes are paralelled together by means of a rod conductor; or alternatively the same rod conductor serves to interconnect current pool terminals of dissimilar electrodes in a tank of dissimilar electrodes in serial or compound serial/parallel combinations; as regards its low impedance current pool execution it can be: (1) having one or more individually outwardly extending current pool terminals installed on two or more sides of the electrode board, shown in FIG. 2 is an illustration of one current pool terminal fitted to either side of the electrode board; or instead two or more than two current pool terminals T100 are mounted on one side or more sides of the electrode board P100, to thereby account for two or more than two current input or output paths, thus achieving a lowering of internal impedance, shown in FIG. 3 is an illustration of two current pool terminals installed on sides opposite each on the electrode board; or alternatively (2) having one or more conductive penetration holes S100 installed individually on chosen quarters or middle quarters on two or more than two sides abutting the exteriority of the electrode board P100, or instead having same, but at least two, on chosen quarters on one side or on more sides, and that complemented with one or more isolation space or insolation gap reserved in chosen or middle quarters on two or more than two sides of aforementioned positive electrode board or negative electrode board, serving to accommodate passage of the rod conductor B100 once electrode boards of dissimilar polarities are intercrossed and set in order, without coming into contact, or instead the same may be replaced with one or more isolated penetration holes each sized larger than the rod conductor, so that the electrode board is equiped with two or more that two input or output current paths, and that in order to reduce the internal impedance of the battery installations, FIG. 4 illustrates an example of the electrode board equiped with two penetration holes and two isolation gaps structured accordingly; such an improved structure, while it, by increasing current paths in the charge storage/discharging devices, does achieve in reduction of the internal impedance of the storage discharge devices, polylateral and multiple path interconnected in series or parallel between individual tanks of electrodes involved in the art will necessarily mean increased production costs and more time and labor required in the production process, these being obvious drawbacks to prior arts.

SUMMARY OF THE INVENTION

Charging/Discharging Device featuring one or more current pool means so that the electrode board is furnished with multiple current pool paths, and with current pool terminals in tanks of like electrode polarities or those in tanks of dissimilar electrode polarities but alike in voltage specifications and electrode polarities boards connected in parallel, or alternatively with current pool terminals between boards of dissimilar electrode polarities in tanks different in electrode polarities interconnected in series or in compound serial parallel combinations, and that complemented by having the exteriority of the positive or negative electrode board on both sides of individual electrode tanks made into a low impedance structure that is favorable to incoming/outgoing confluent currents.

BRIEF DESCRIPTION OF THE DRAWINGS

FIG. 11 illustrates, for each independently installed electrode tank, the current pool conductor assembly of which the exteriority of the external electrode board is configured in strips;

FIG. 12 is a side view of what is shown in FIG. 11;

FIG. 13 is an illustration of what is shown in FIG. 11, executed such that a like-polarity parallel connection assembly is the theme;

DETAILED DESCRIPTION OF THE PREFERRED EMBODIMENTS

Figure 1:
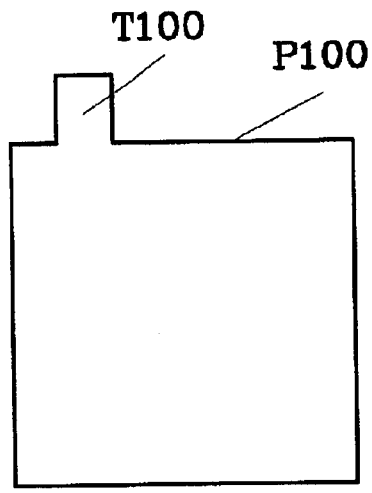
FIG. 1 is an illustration of a prior art current pool terminal electrode board provided unilaterally.
Figure 2:
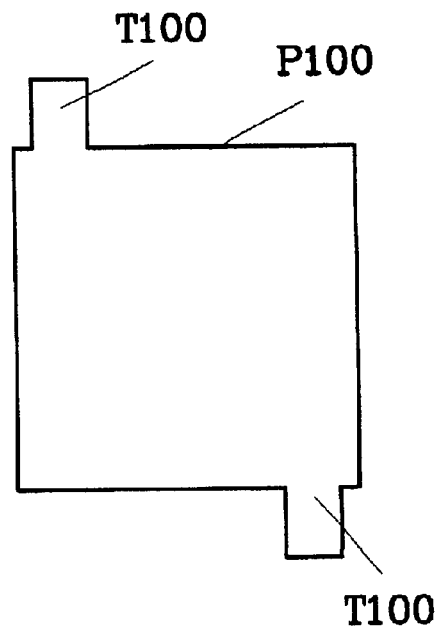
FIG. 2 is an illustration of an example whereof a current pool terminal is provided on either side of an electrode board.
Figure 3:
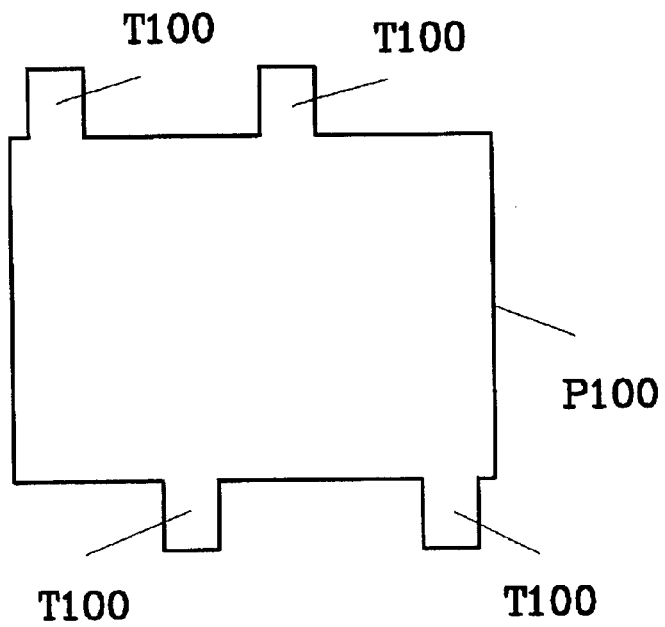
FIG. 3 is an illustration of an example whereof two current pool terminals are provided on opposite sides of an electrode board.
Figure 4:
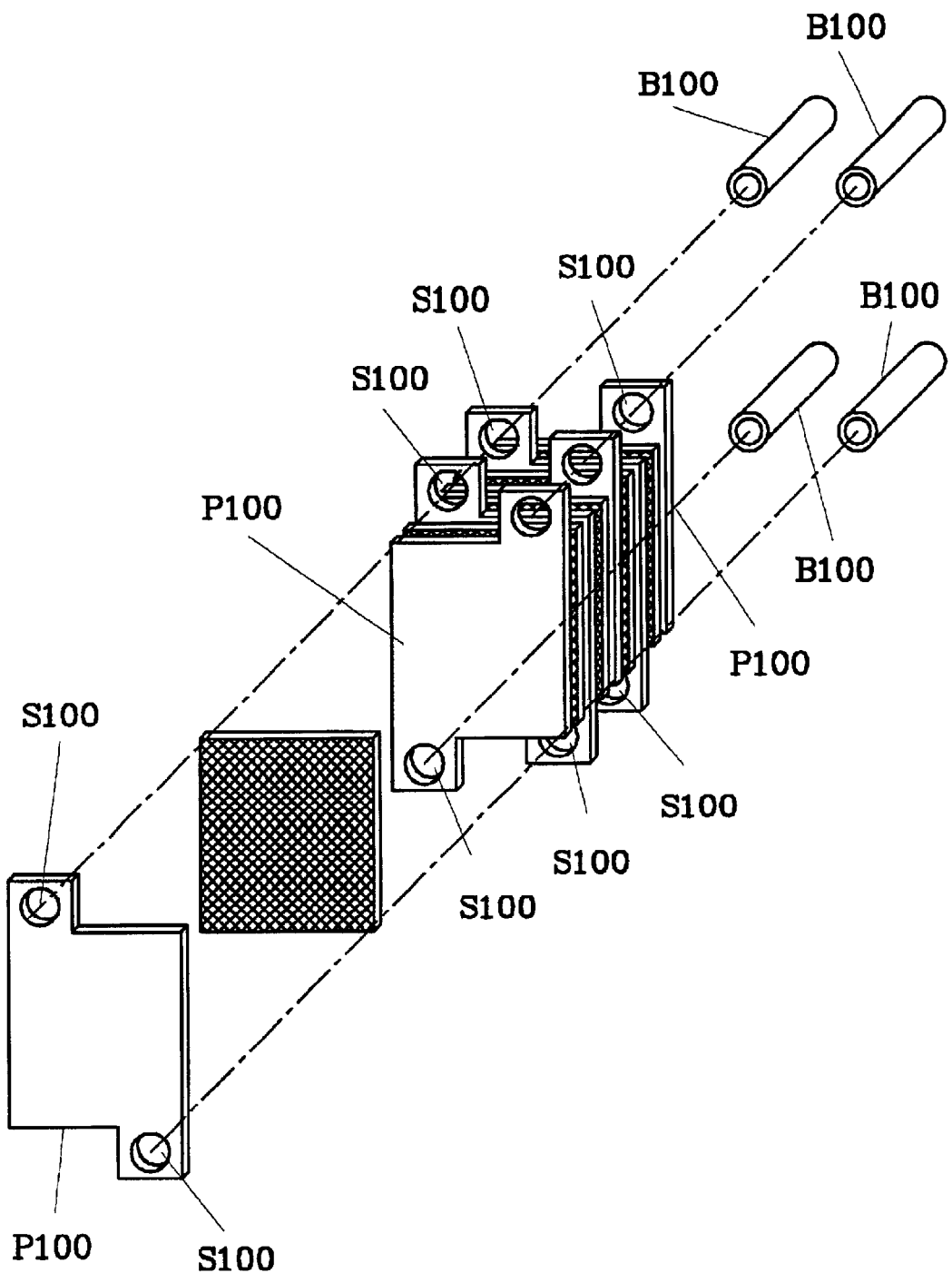
FIG. 4 is an illustration of an example whereof the electrode board is furnished with two penetration holes and two isolation gaps.

A low internal impedance current pool structure as part of a charging/discharging device according to the invention is meant for application in a primary cell, or a secondary rechargeable cell, or a fuel cell, or still a capacitor or super capacitor, with each electrode plate of said charging/discharge device furnished with one or more than one current pool means so that the electrode plate is enabled as a multiple current converging circuit, such that by paralleling current pool terminals present in the tanks of like electrodes or of like potential specifications but present in tanks of unlike electrodes, and as present on electrode plates of like polarities, or else by serially connecting or compound serial/parallel connecting current pool terminals between electrode plates of unlike polarities in tanks of electrodes or negative polarity electrode plates on both sides of each individual electrode tank is made to be of a low impedance structure very advantageous to both ingoing and outgoing pool currents.

Charging/Discharging Device to be connected into:

(1) a tank of identical polarity electrodes, or a tank of dissimilar polarity electrode by means of coupling conductors, whereof current pooling terminals of identical potentials and identical polarity are in parallel;

(2) serving to be connected with current pooling terminals between pole boards of dissimilar polarities in a tank of dissimilar electrodes, executed in serial connection or compound serial/parallel connection.

Further, on the exterior side of the electrode board, of positive or negative polarity, on both sides of the individually installed electrode tank is executed a low resistance current pool structure of any chosen geometry to facilitate infeeding/outfeeding of confluent currents, executed in the form of inflowing/effluent pooling terminals, or that incorporated with parallel current pool conductor, or as made from material of better conductivity with a view to reduce the resistance to infeeding/outfeeding confluent currents; Structurally it can comprise singly or plurally any or some of the features outlined below:

plate or strip or web form structure for connection to respective output/input current pool terminals T100 of which individual electrode tanks are installed outside the positive or negative polarity electrode board P200, on both sides of the electrode tank, or other low impedance current pool conductor assembly made of chosen materials in otherwise geometrical configurations; or plate or strip or web form structure for connection to respective output/input current pool terminals of which individual electrode tanks are installed outside the positive or negative polarity electrode boards on both sides of the electrode tank, with areas between consecutive output current pool terminals interconnected by welding, soldering, riveting or screwing technique, or prestressed, or burial or inlay or otherwise means, to facilitate pooling of input/output currents, or other low impedance current pool conductor assembly of chosen material in otherwise geometrical configuration; or plate or strip or web form structure with output/input current pool terminals associated with the overall storage/discharging device being installed outside the positive or negative polarity electrode board on both sides of the electrode tank, to facilitate transiting of incoming/outgoing current pool, or low impedance current pool conductor assembly of chosen material but otherwise geometrical configuration, said plate form encompassing thickened board of uniform or non-uniform, tilted sheets; or current pool terminals for input/output purposes secured by soldering, welding, riveting, screwing, prestressing technique or by burial, inlay or otherwise means among themselves, established outside the positive or negative polarity electrode boards on both sides of the electrode tank, led to correspondent terminals on the master storage/Discharge Assembly, in plate or strip or web form to facilitate pooling of incoming/outgoing currents, being a low impedance conductive assembly of a chosen geometry or otherwise materials; or Interconnect pieces or bars of conductors of a chosen geometry and of chosen materials interposed between parallel conductors between sets of input/output current pool terminals on a plurality of electrode boards of like polarities; or Interconnect pieces or bars of chosen geometry and material incorporated additionally between a plurality of serially parallelly connected conductors on input/output current pool terminals on sets of electrode boards of dissimilar polarities.

In a low impedance current pool assembly for a storage/discharge device structured accordingly the positive or negative polarity electrode board can be composed of other low impedance materials where needed different from those low impedance structure disclosed in the foregoing in respect of exteriority, and as part of which the current pool terminals for input/output purposes can be provided singly or plurally, on single side or on more than one side.

A number of examples of a low impedance current pool assembly for a storage/discharge device incorporating one or more of the above-mentioned features and their applications will be described below, lots of geometry do apply for this design, options are also open as to the number of sides of the current pool terminals and the number of the terminals themselves, our description will go with reference to the example given in any of FIG. 5 through FIG. 35, which by no means serves to delimit the scope of application of the low impedance current pool assembly of the subject storage/discharge device, to set off the chief features of the subject design, casings which had long been employed in conventional storage/discharge devices as well as electrolytic isolation shields, mats or membranes laid between electrode boards of dissimilar polarities, of known common art, will only be mentioned briefly or omitted altogether in the course of descriptions following next in the context.

Figures 5, 6:
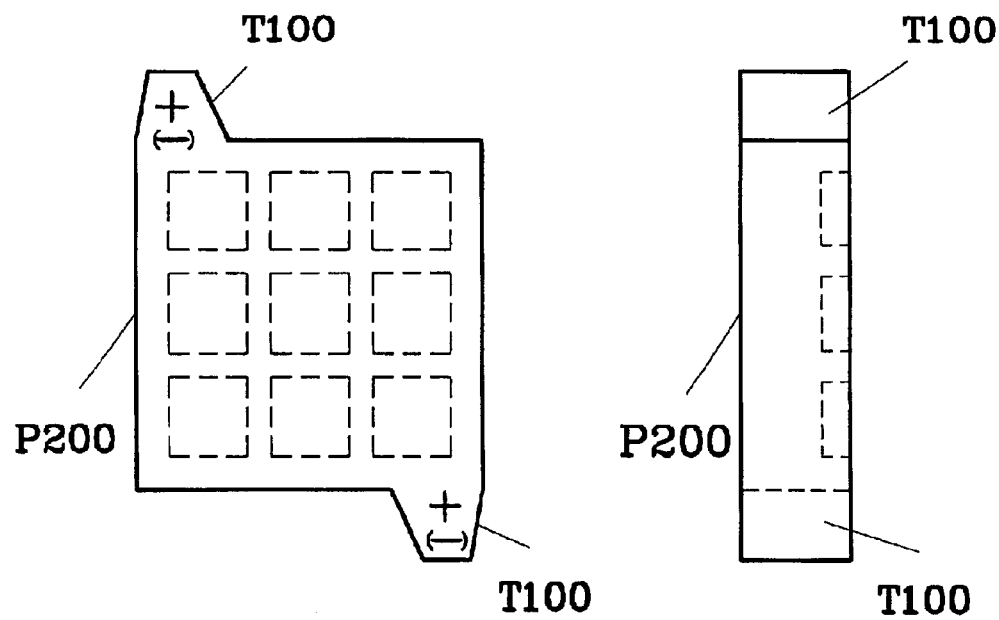
FIG. 5 illustration, in individual electrode tanks, structure of current pool conductor of which the exteriority of the external electrode board is executed integral with or reinforced with a thickened plate.
FIG. 6 illustrates a side view of what is shown in FIG. 5.
Figure 7:
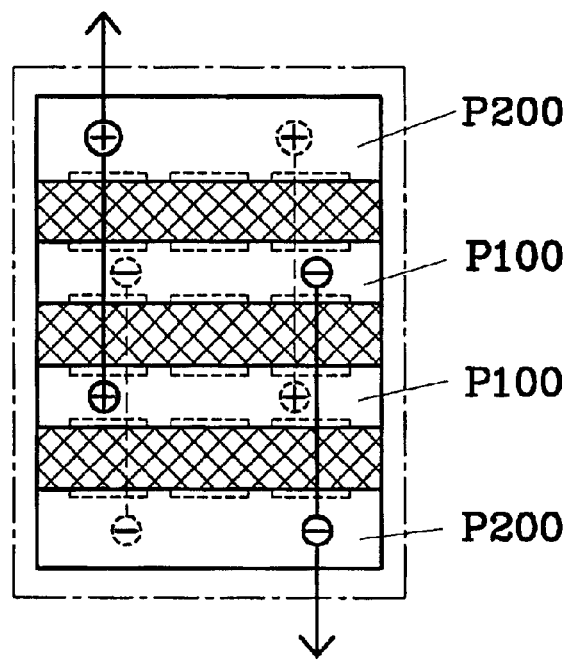
FIG. 7 illustrates what is shown in FIG. 5 as executed in like polarity on like polarity parallel assembly.
Figures 8, 9:
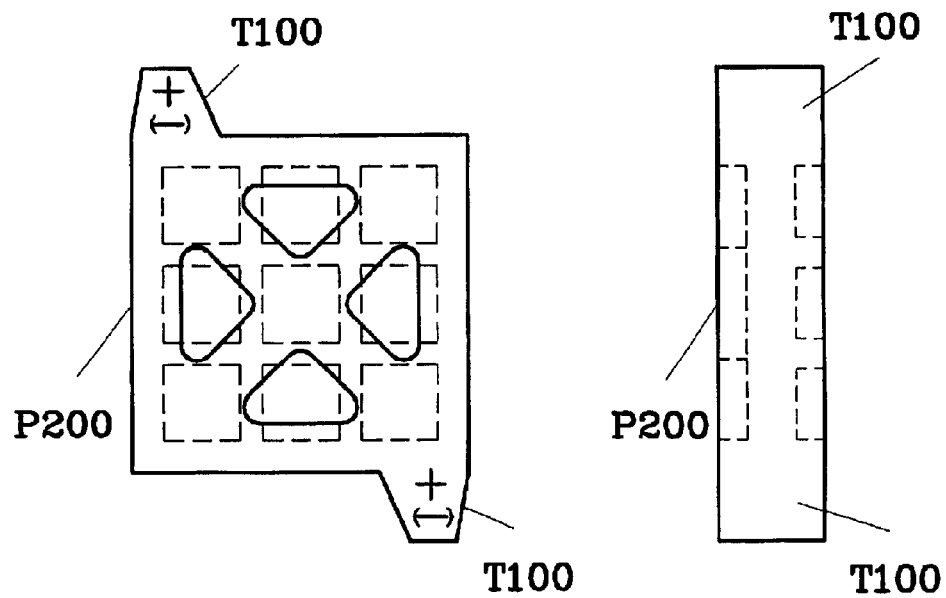
FIG. 8 illustrates, as of each independently installed electrode tank, a current pool conductor assembly executed in web form on the external side of the external electrode board.
FIG. 9 gives a side view of what is shown in FIG. 8.
Figure 10:
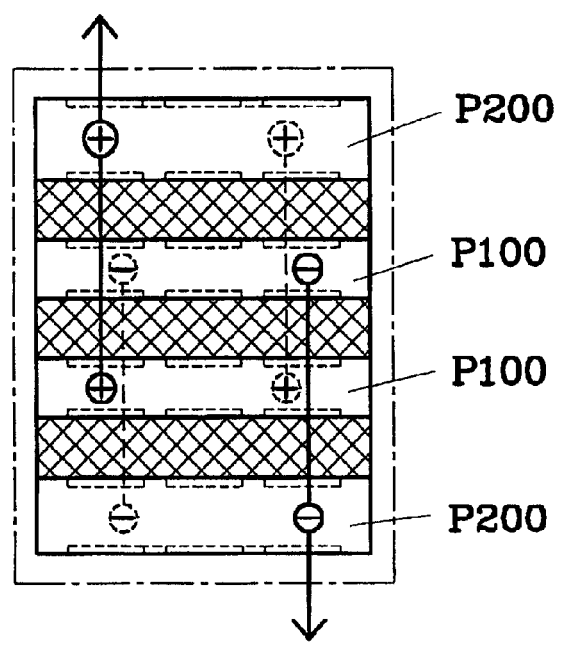
FIG. 10 illustrates what is shown in FIG. 8, executed in like polarity on like polarity parallel assembly.

The subject low impedance structure of the low impedance current pool assembly of the subject storage/discharge device includes improvement of the exteriority of the positive or negative polarity electrode board and current pool terminals, on both sides of each independently installed electrode tank, as illustrated in FIG. 5 through FIG. 10, noted hereinbefore, the design in respect of the improvement of the positive or negative exteriority of the electrode board on both sides of the independently installed electrode tank is thus: having one or more piece of paralleled positive electrode board P100 and as matched thereto, one or more piece of paralleled negative electrode board P100, set in individual electrode tanks to constitute individual electrode pairs, then have flat plate form current pool conductor assembly of chosen material and made to specified thickness installed way between respective current pool terminals on the exteriority of positive or negative electrode board P200 on both sides of each individual electrode tank, so that it is made that the impedance prevalent way between the current pool terminals on the periphery of the external positive or negative electrode board P200 is inferior to that impedance prevailing across the normal electrode surface duly applied with one layer of chemically active material in lattice configurations on the same electrode board; shown in FIG. 5 is an illustration of the current pool conductor assembly of a plate form or thickened plate form or integral with the exteriority of the external electrode board, in individual electrode tank, of the subject storage/discharge device, the plate form being uniform or non-uniform in thickness, at a slope in place; a side view of what is given in FIG. 5 is shown in FIG. 6; shown in FIG. 7 is an execution of what is shown in FIG. 5 with like polarity on like polarity paralleling; way between respective current pool terminal T100, outside the positive or negative polarity electrode board P200 on both sides of individual electrode pairs installed in aforementioned individual electrode tank, may be processed straight conductive assembly of given thickness and in webform, such as that illustrated in FIG. 8, still pursuant to the invention, a side view of what is shown in FIG. 8 is given in FIG. 9; an execution of the example shown in FIG. 8 with like polarity paralleling is shown in FIG. 10.

In the individual electrode pairs formed in the independently installed electrode tank, way between the current pool terminals outside the positive or negative polarity electrode board P200 on both sides, pieces or webform or stripe form current pool conductor assembly are interconnected by soldering, welding, riveting, screw coupling, prestressed bonding, internal burial, laying or otherwise technique, in order that the impedance prevailing between the current pool terminals T100 on the perimeter of the externally provided positive or negative polarity electrode boards be controlled inferior to the impedance on the normal electrode surface on the other side of the same electrode board that is applied with a lattice work of chemically active coating; shown in FIG. 11 is an illustration of the strip-formed current pool conductor assembly on the outside of the externally provided electrode board in each independently installed electrode tank of the low impedance current pool structure according to the subject storage/discharge device, a side view of this illustration is given in FIG. 12, as dependent on FIG. 11, an execution of what is shown in FIG. 11 with like polarity paralleling is shown in FIG. 13.

Figure 14:
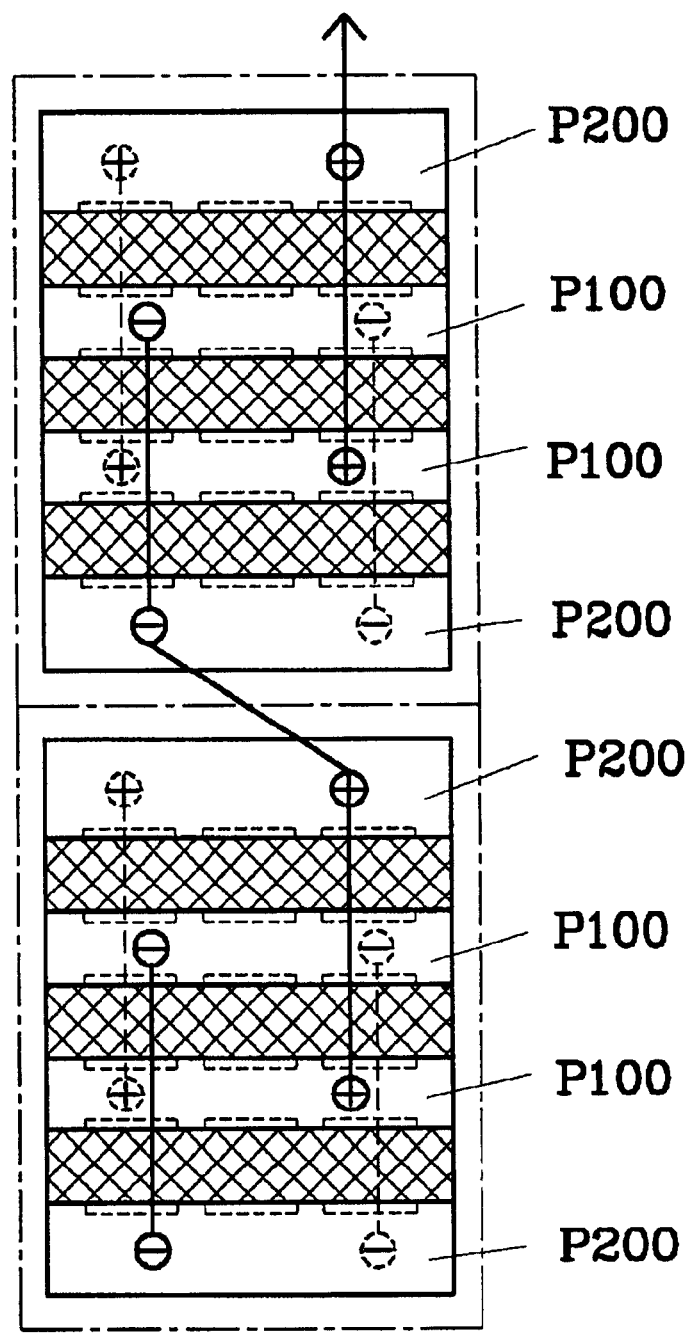
FIG. 14 is an illustration of FIG. 5 with the current pool terminals for each independent electrode tank executed in multiple serial connection layout.

The electrode board with plate form terminals on the outside as aforementioned is good for connection to two or more than two independent electrode tanks, and hence good for like polarity on like polarity paralleling or opposite polarity serial connection under the same voltage specifications, a multiple serial combination made with respect to the current pool terminals on respective independent electrode tank illustrated in FIG. 5 is illustrated in FIG. 14.

Figures 15, 16:
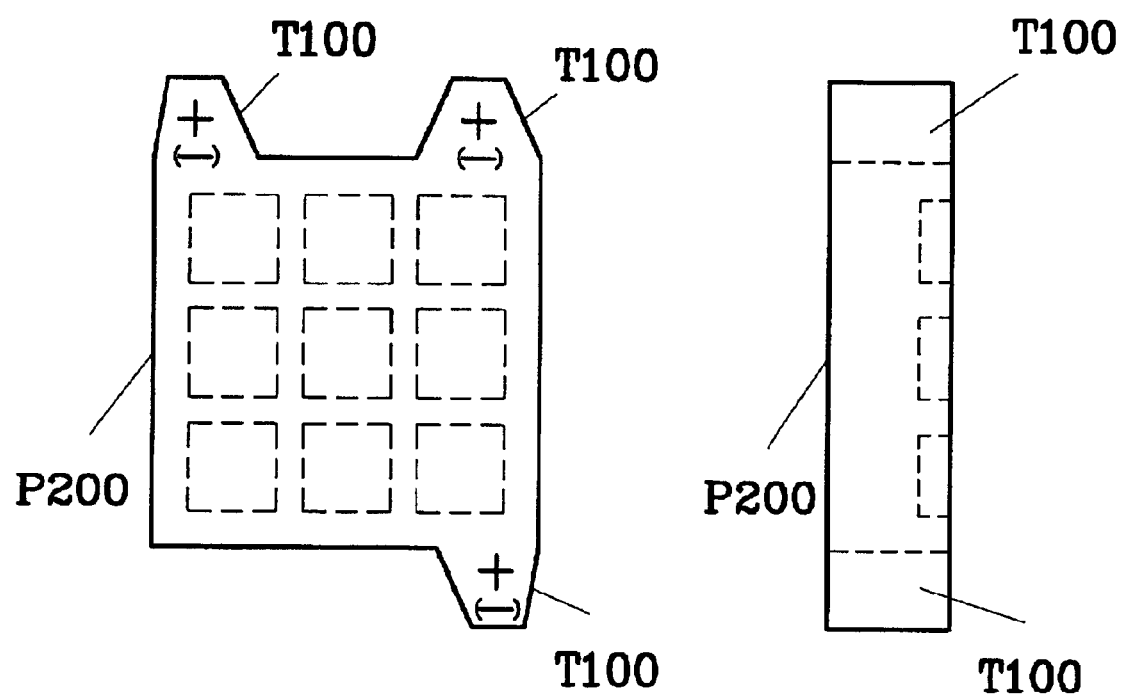
FIG. 15 illustrates an execution of the electrode board whereof the exteriority comprises plate conductor assembly, such that the board is furnished with two or more than two current pool terminals.
FIG. 16 is a side view of what is shown in FIG. 5.

Additionally, where required on that side of the externally provided plate-form terminalled electrode board meant to couple with current pool terminals coming from other electrode tanks may be mounted two or more than two current pool terminals to thereby account for multiple coupling possibilities so that impedance is lowered in the long run; an example of this is shown in FIG. 15; a side view of this presentation is given in FIG. 16, as dependent on FIG. 15.

Figure 17:
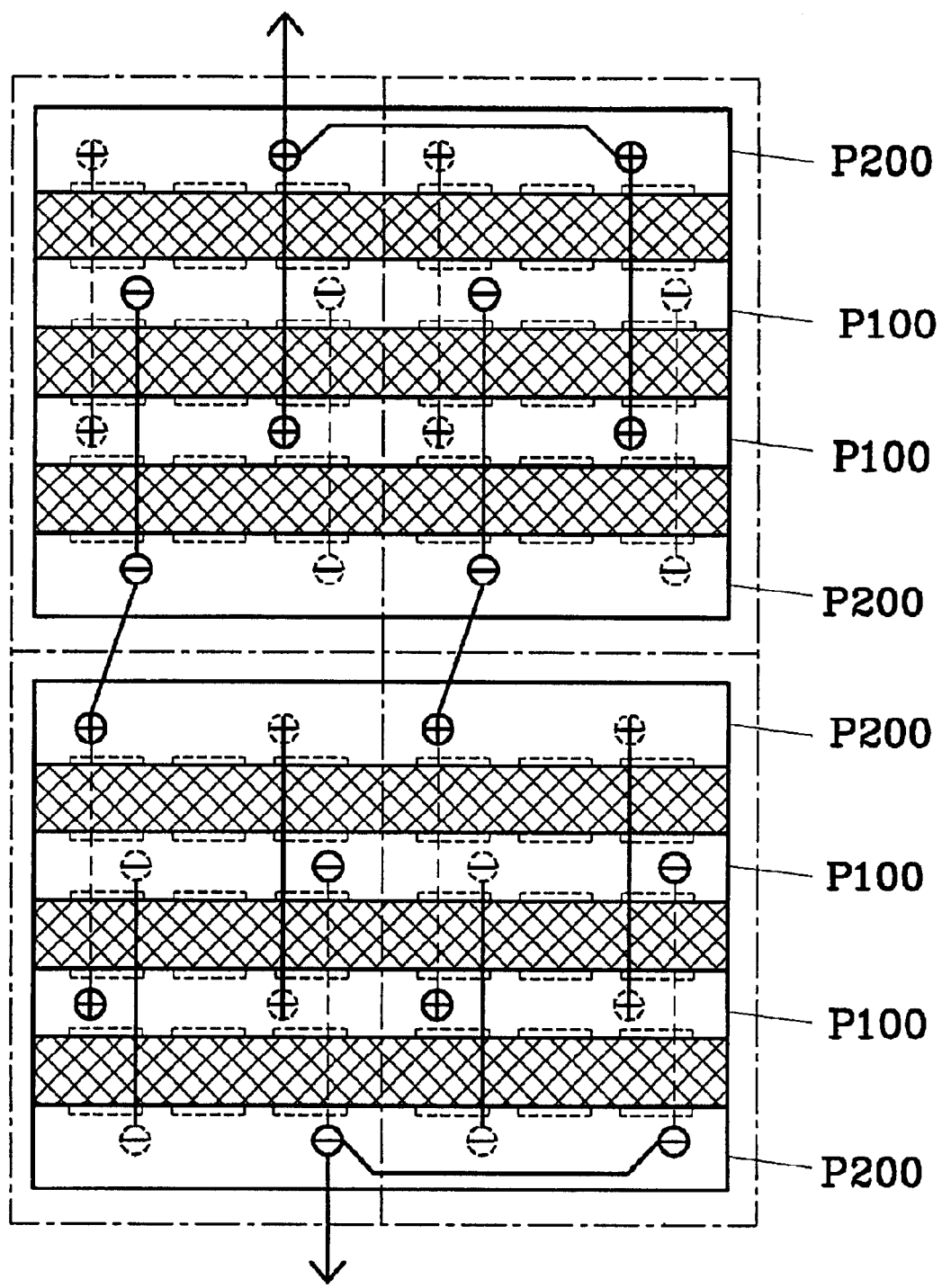
FIG. 17 is an illustration of what is shown in FIG. 5 such that the current pool terminal in each independent electrode tank is executed in multiple compound serial/parallel combinations.

In the subject storage/discharge device in general, in the low impedance current pool structure, in the current conductor assembly outside the positive or negative electrode board P200 on both sides of the individual electrode tank in particular, are provided two current pool terminals T100 to accommodate serial or parallel combination with each electrode tank where multiple sets of electrode tanks are deployed for application; shown in FIG. 17 is as illustration of multiple serial parallel combination sourced to each current pool terminal on the part of each independent electrode tank shown in FIG. 5.

In the subject storage/discharge device specifically with respect to its low impedance current pool structure, with a view to further reduce the impedance on the part of both the current pool terminal and of the electrode board, a feasible approach is to process the current pool terminal trapezoidal extending outwardly, such that the wider base of the trapezoidal current pool terminal is coupled to the electrode board, whereby the internal impedance on the terminal, output or input, of the electrode board, is duly reduced.

Examples of application of the aforementioned trapezoidal current pool terminal and electrode boards include: normal electrode boards P100 with both sides applied with latticed chemically active coating, two or more than two outputting or inputting current pool terminal T100 on the outside of the positive or negative polarity electrode board P200 on both sides of each electrode tank, possible for mounting on one side or more sides of the electrode board P100 or the positive or negative electrode board P200, or for one or more current pool terminal to be installed on two or more sides of the electrode board P100 or of the positive or negative polarity electrode board.

Figure 18:
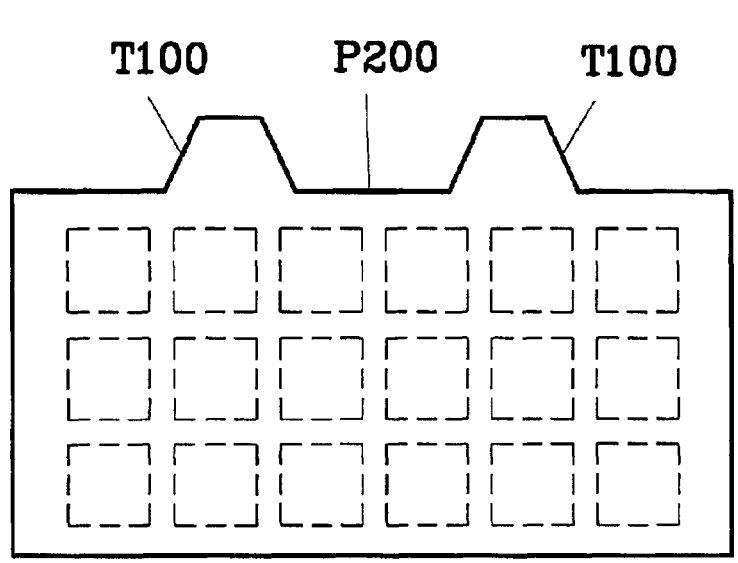
FIG. 18 is one example of the electrode board complete with a current pool terminal, according to the invention.
Figure 19:
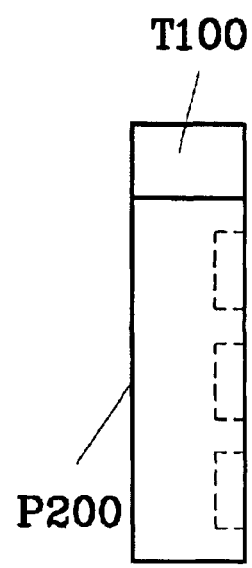
FIG. 19 is a side view of what is given in FIG. 18.
Figure 20:
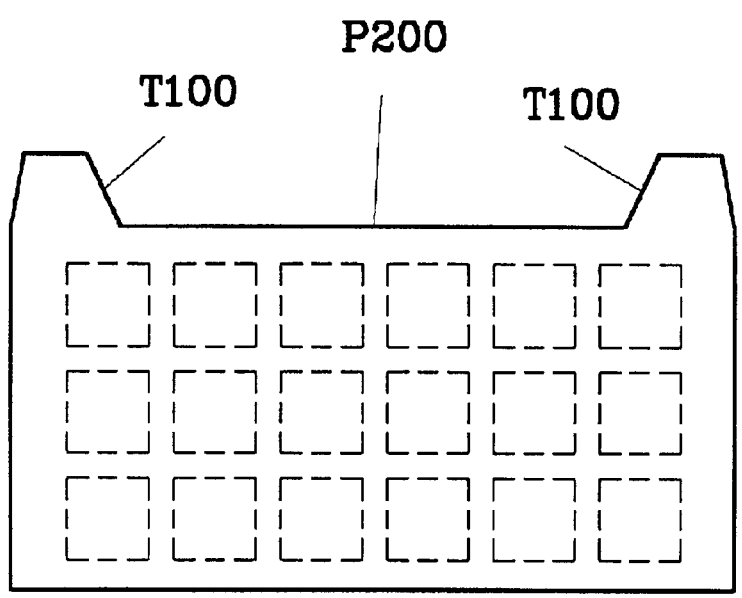
FIG. 20 is a second embodiment of the electrode board complete with current pool terminal according to the invention.

Shown in FIG. 18 is one embodiment of the electrode board integral with current pool terminal of a low impedance current pool structure pursuant to the invention storage/discharge device, featuring two trapezoidal current pool terminals T100 in the middle of one external side of the positive or negative electrode board P200 on both sides of the individually installed electrode tank, just to make for a correspondent positive or negative electrode pair with the electrode board shown in FIG. 20, a side view of what is shown in FIG. 18 is shown in FIG. 19.

Figure 21:
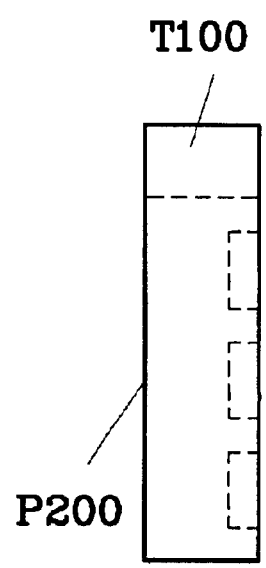
FIG. 21 is a side view of what is given in FIG. 20.

Represented in FIG. 20 is a second embodiment of the invention storage/discharge device with low impedance current pool assemblies with reference to its electrode board integral with current pool terminals, whereof trapezoidal current pool terminals T100 are provided on both sides of the exteriority of the positive or negative electrode board P200 on both sides of each individual electrode tank, to form electrode pair with electrode board symmetrically shown in FIG. 18, a side view of what is shown in FIG. 20 is given in FIG. 21.

Figure 22:
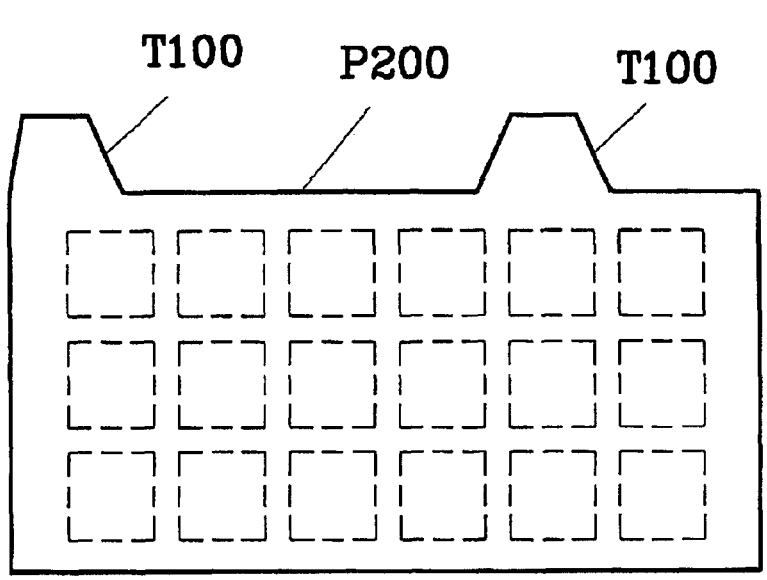
FIG. 22 is a third embodiment of the electrode board complete with current pool terminal, according to the invention.
Figure 23:
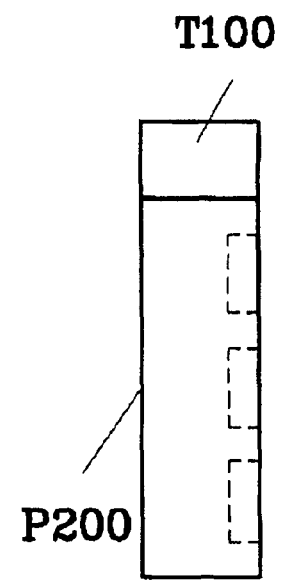
FIG. 23 is a side view of what is given in FIG. 22.

Represented in FIG. 22 is a third embodiment of the electrode board complete with current pool terminals of a low impedance current pool design of the invention storage/discharge device, whereof on either of both external sides of the positive or negative electrode board P200 on both sides of individual electrode tank are installed two trapezoidal current pool terminals T100, extending outwardly, characterized in that a dimensional differential exists between the hunch peak of current pool terminals on the same sides of the trapezoid and the edges on both sides of the electrode board so that once an electrode pair is produced by superposing the backsides of the two similarly configured electrode boards, interwoven superposition is made involving the positive/negative polarity electrodes of adjacent electrode boards, with current pool terminals T100 intercrossing but not intervening each other, so as to facilitate interactive coupling, with better current pooling effects realized on the basal area of the wider trapezoid; a side view of what is shown in FIG. 23 is given in FIG. 22.

Figures 24, 25:
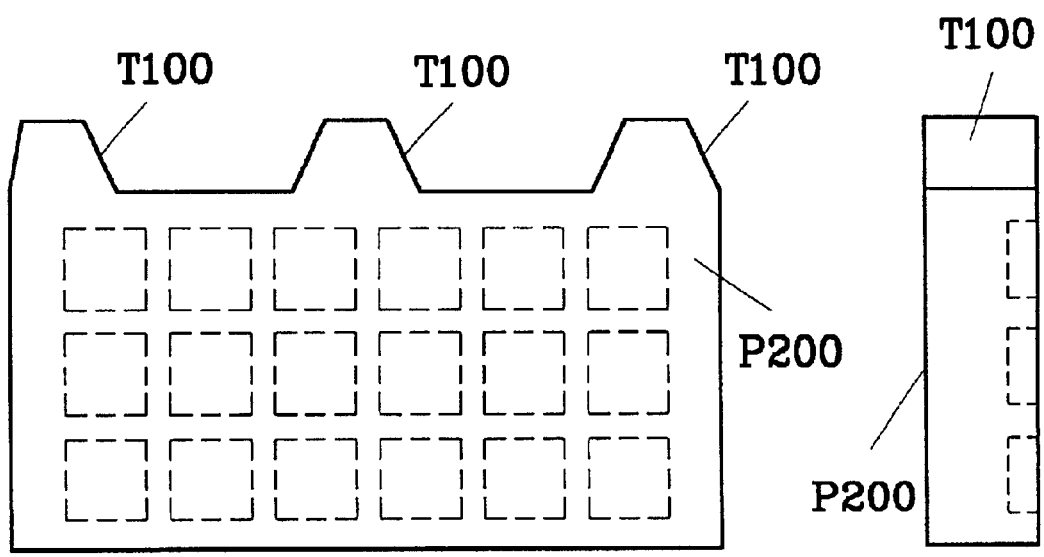
FIG. 24 is a fourth embodiment of the electrode board complete with current pool terminal, according to the invention.
FIG. 25 is a side view of what is shown in FIG. 24.

Represented in FIG. 24 is a fourth embodiment of the electrode board complete with current pool terminals of a low impedance current pool design of the invention storage/discharge device, comprising three externally extending trapezoidal current pool terminals T100 on each external side of the positive or negative polarity electrode board P200 on both sides of the electrode tank, characterized in that a dimensional differential exists between the hunchback of current pool terminals on the same side of the trapezoid and the edges on both sides of the electrode board, so that once an electrode pair is produced by superposing the backsides of the two similarly configured electrode boards, interwoven superposition is made involving the positive/negative polarity electrodes of adjacent electrode boards, with current pool terminals T100 intercrossing but not intervening each other, so as to facilitate interactive coupling, with better current pooling effects realized on the basal area of the wider trapezoid; a side view of what is shown in FIG. 24 is given in FIG. 25.

Figure 26:
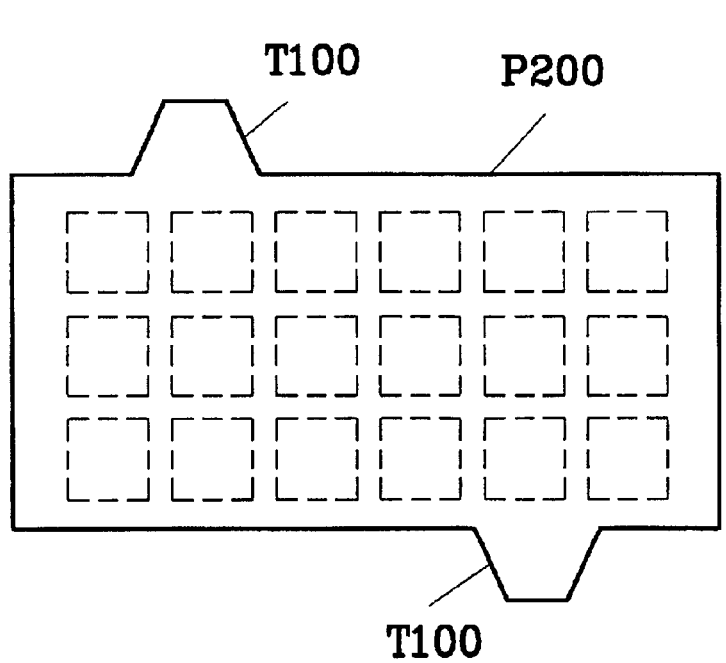
FIG. 26 is a fifth embodiment of the electrode board complete with current pool terminal, according to the invention.
Figure 27:
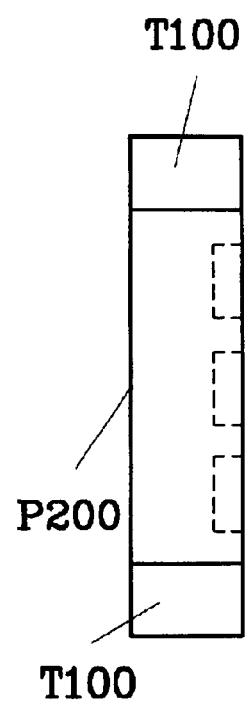
FIG. 27 is a side view of what is shown in FIG. 26.
Figure 28:
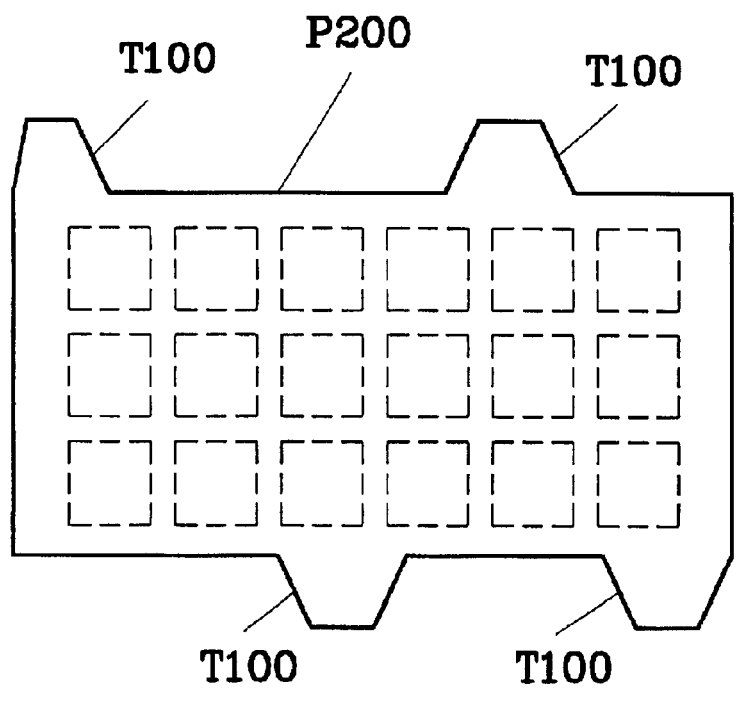
FIG. 28 is a sixth embodiment of the electrode board complete with current pool terminal, according to the invention.
Figure 29:
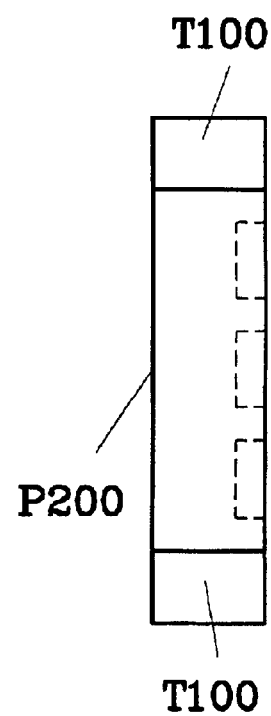
FIG. 29 is a side view of what is shown in FIG. 28.

A fifth embodiment of the electrode board with current pool design of the invention storage/discharge device highlighted with a low impedance current pool feature is represented in FIG. 26, comprising an outwardly extending trapezoidal current pool terminal T100 on two opposite sides of a quadrilateral positive or negative electrode board P200 on both sides of individually installed electrode tank, characterized in that a dimensional differential is maintained between the hunch peak of current pool terminals on the same sides of the trapezoid and the edges on both sides of the electrode board so that once an electrode pair is formed by superposing the backsides of the two similarly configured electrode boards, interwoven super-positions is made involving the positive/negative polarity electrodes of adjacent electrode boards, with current pool terminals T100 intercrossing but not intervening each other, so as to facilitate interactive coupling, with better current pooling effects realized on the basal area of the wider trapezoid, a side view of what is shown in FIG. 26 is given in FIG. 27;

A sixth embodiment of the electrode board with a low impedance current pool design of the invention storage/discharge device is illustrated in FIG. 28, comprising two outwardly extending trapezoidal current pool terminals T100 on two opposite sides of a quadrilateral positive or negative electrode board P200 on both sides of individually installed electrode tank, characterized in that a dimensional differential is maintained between the hunch peak of current pool terminals on the same sides of the trapezoid and the edges on both sides of the electrode board so that once an electrode pair is formed by superposing the backsides of the two similarly configured electrode boards, interwoven super-positions is made involving the positive/negative polarity electrodes of adjacent electrode boards, with current pool terminals T100 intercrossing but not intervening each other, so as to facilitate interactive coupling, with better current pooling effects realized on the basal area of the wider trapezoid, a side view of what is shown in FIG. 28 is given in FIG. 29.

Figures 30, 31:
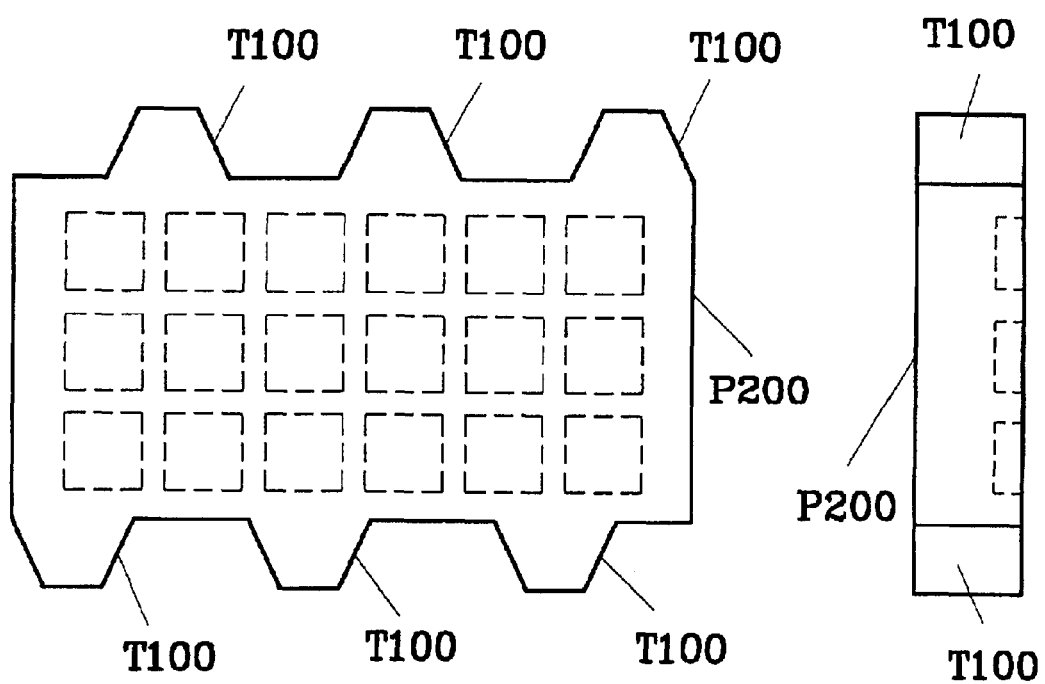
FIG. 30 is a seventh embodiment of the electrode board complete with current pool terminal, according to the invention.
FIG. 31 is a side view of what is shown in FIG. 30.

A seventh embodiment of the electrode board with a low impedance current pool feature is represented in FIG. 30, comprising three outwardly extending trapezoidal current pool terminals T100 on two opposite sides of a quadrilateral positive or negative electrode board P200 on both sides of individually installed electrode tank, characterized in that a dimensional differential is maintained between the hunch peak of current pool terminals on the same sides of the trapezoid and the edges on both sides of the electrode board so that once an electrode pair is created by superposing the backsides of the two similarly arrayed electrode boards, interwoven superposition is made involving the positive/negative polarity electrodes of adjacent electrode boards, with current pool terminals P100 intercrossing but not intervening each other, so as to facilitate interactive coupling, with better current pooling effects realized on the basal area of the wider trapezoid, a side view of what is shown in FIG. 30 is given in FIG. 31.

Figures 32, 33:
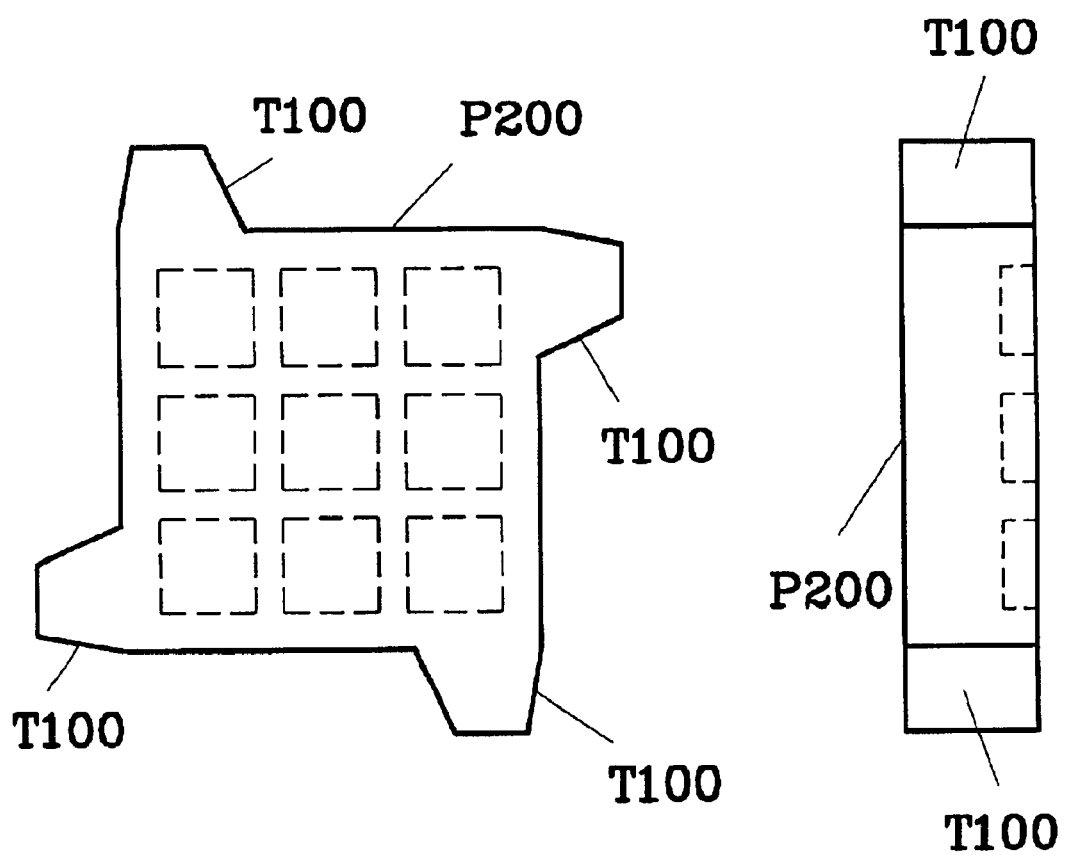
FIG. 32 is an eighth embodiment of the electrode board complete with current pool terminal, according to the invention.
FIG. 33 is a side view of what is shown in FIG. 32.

An eighth embodiment of the electrode board with a low impedance current pool design of the invention storage/ discharge device is illustrated in FIG. 32, comprising an outwardly extending trapezoidal current pool terminal T100 on two opposite sides of a quadrilateral positive or negative electrode board P200 on both sides of individually installed electrode tank, characterized in that a dimensional differential is maintained between the hunch back of current pool terminals on the same sides of the trapezoid and the edges on both sides of the electrode board so that once an electrode pair is created by superposing the backsides of the two similarly configured electrode boards, interwoven superposition is made involving the positive/negative polarity electrodes of adjacent electrode boards, with current pool terminals P100 intercrossing but not interfering each other, so as to facilitate interactive coupling, with better current pooling effects realized on the basal area of the wider trapezoid, a side view of what is shown in FIG. 32 is given in FIG. 33.

Figure 34:
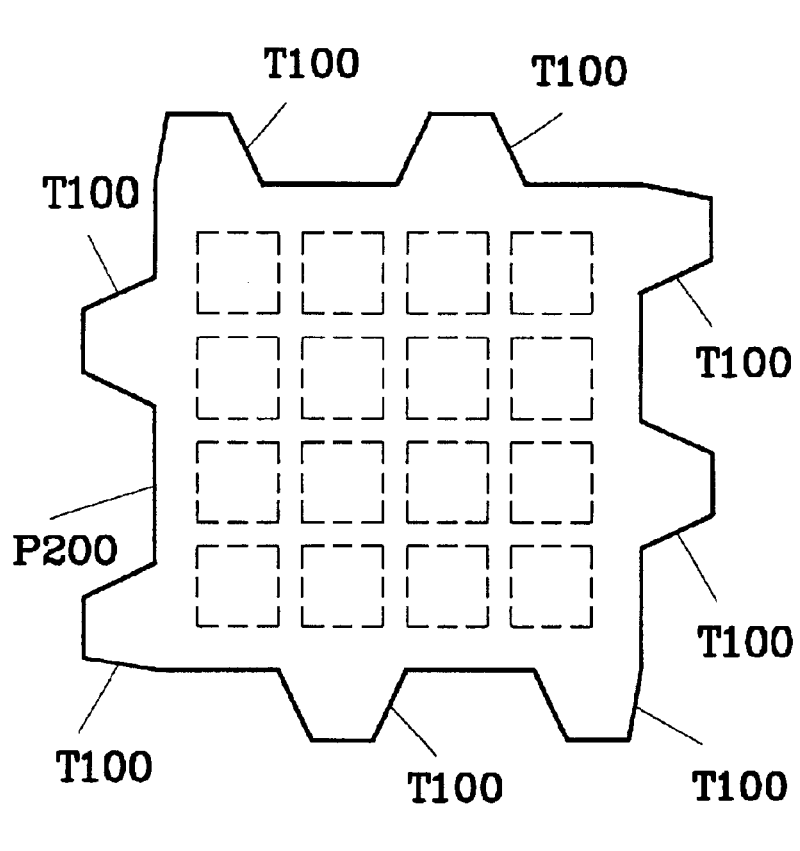
FIG. 34 is a ninth embodiment of the electrode board complete with current pool terminal, according to the invention.
Figure 35:
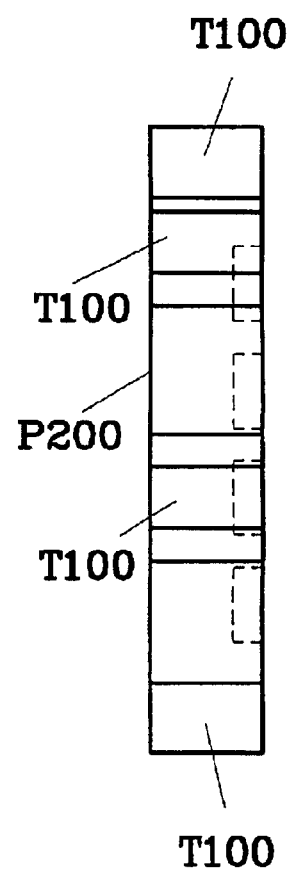
FIG. 35 is a side view of what is shown in FIG. 34.

A ninth embodiment of the electrode board with a low impedance current pool design of the invention storage/discharge device is illustrated in FIG. 34, comprising two outwardly extending trapezoidal current pool terminals T100 on two opposite sides of a quadrilateral positive or negative electrode board P200 on both sides of individually installed electrode tank, characterized in that a dimensional differential is maintained between the hunch back of current pool terminals on the same sides of the trapezoid and the edges on both sides of the electrode board so that once an electrode pair is created by superposing the backsides of the two similarly configured electrode boards, interwoven superposition is made involving the positive/negative polarity electrodes of adjacent electrode boards, with current pool terminals P100 intercrossing but not interfering with each other, so as to facilitate interactive coupling, with better current pooling effects realized on the basal area of the wider trapezoid, a side view of what is shown in FIG. 34 is given in FIG. 35.

It is to be noted that any and all the examples, embodiments of the invention represented in FIG. 5 through FIG. 35 are illustrative but not restrictive of the scope of application of the invention, in its application to quadrilateral or nearly quadrilateral electrode boards, apart from the provision of current pool terminals on two or four sides, it is also feasible to provide current pool terminals on three sides of the electrode board too, and the configuration of said electrode board is not restricted to a quadrilateral only, indeed it can instead take the form of a circle, a near circle, an ellipse, a near ellipse, a triangle, a polylateral, including without limitation: triangle, quadrilateral, quintuple lateral, hexagon, septuple lateral, octuple lateral, with each electrode board furnished with two or more than two current pool terminals so that each electrode board is equipped with two or more than two current pooling loops.

Figure 36:
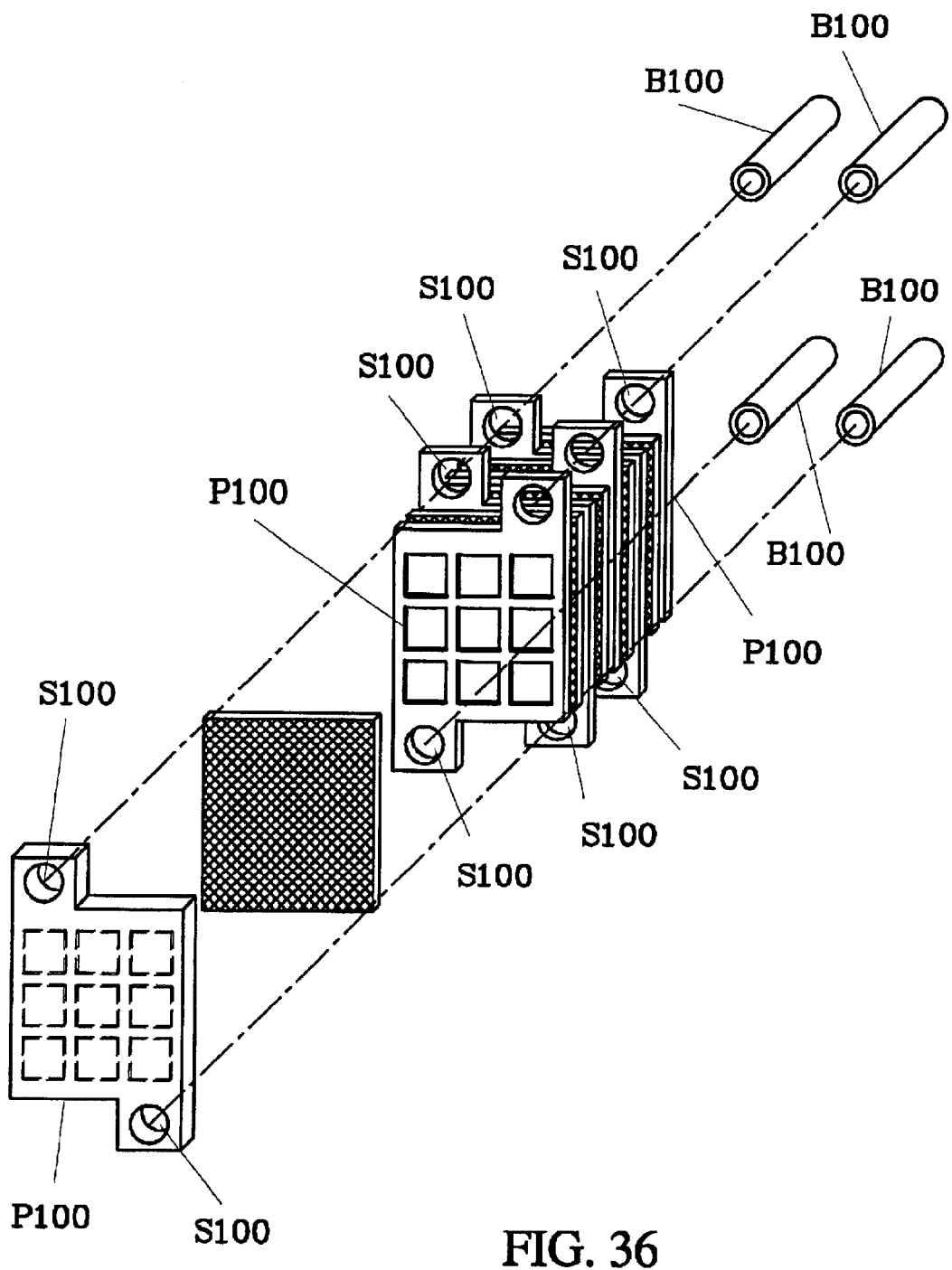
FIG. 36 is an example of the invention charging/discharging device on an assembly of penetration holes with rod conduction.

Shown in FIG. 36 is an embodiment of the invention of which the storage/discharge device is composed of penetration holes and rod conductors.

In a low impedance current pool assembly which forms part of the invention storage/discharge device described hereinbefore, apart from the input/output current pool terminals on the positive, negative electrode boards on both sides of the electrode tank which, as required, may be installed singly or plurally, on one side or on more sides, all the other electrode boards can be structured such that one or more current pool terminal individually extending outwards are installed on two or more than two current pool terminals are all installed on just one side or more sides, to enable multiple current path paralleling converged on electrode boards of like polarities, or instead multiple path series connection between electrode boards of dissimilar polarities; structurally, the current pool terminals are made of hardcore or hollow-set tubular rod conductors bearing circular, square, otherwise geometric configurations, to be mounted into position across the conductive penetration holes present way between the electrode boards of the storage/discharge device, so that parallel connection is made possible with electrode boards of like polarities, or alternatively serial connection is made among electrode boards of dissimilar polarities, so still so that a combined serial/parallel connection is consummated: further parallel execution is extended to encompass the current pool terminals, being conductor themselves, such that they, of identical voltage specifications and on electrode boards of like polarities, from the same or different electrode tanks, the extension goes to series connection too, by interconnecting current pool terminals between electrode boards of different polarities from dissimilar electrode tanks serially and hence compound serial/parallel combination is made possible forthwith, and that complemented with the effort of a low impedance structure whereby input/output current pool terminals are combined to facilitate pooling of incoming/outgoing currents, on the exteriority of positive or negative electrode tanks, or alternatively supplemented with parallel run current pool conductors in an effort to reduce impedance to the confluent incoming or outgoing currents.

All in all, the subject storage/discharge device integral with current pool structure, by the disclosure given in the foregoing, is deemed truly a worthwhile piece of invention in view of structural improvements as well as enhancement of structural strengths.

What is claimed is:

1. A charge/discharge device integral with a low impedance current pool structure, for application in a primary cell, or in a secondary rechargeable/dischargeable cell, or still in a fuel cell or in a capacitor or in a super capacitor, similar charging/discharging device, complete with one or more current pool means to yield multiple current converging paths, characterized in connecting in parallel current confluent terminals as provided in tanks of like polarities, in tanks of unlike polarities but of identical voltage specifications, and those on electrode boards of like polarities, or alternatively in connecting in series or in compound serial/parallel connections current confluent terminals between electrode boards of unlike polarities in tanks of dissimilar electrodes; and in that the exterior sides of the electrode boards of either positive or negative polarity furnished on either side of each individual electrode tank are produced into such a low impedance texture such that it is made advantageous to confluent currents, be it incoming or outgoing, wherein the low impedance current pool structure further is connected into a tank of identical polarity electrodes, or a tank of dissimilar polarity electrodes by means of coupling conductors, whereof said current pool terminals of identical potentials and identical polarity are in parallel, or serving to be connected with current pooling terminals between electrode boards of dissimilar polarities in a tank of dissimilar electrodes, executed in serial connection or compound serial/parallel connection, characterized in that the positive or negative polarity electrode board can be composed of other low impedance materials, and as part of which the current pool terminals for input/output purposes can be provided singly or plurally, on a single side or on more than one side.

2. A charge/discharge device according to claim 1, wherein low impedance current pool conductive structure includes interconnect pieces or bars of conductors of a chosen geometry and of chosen materials interposed between parallel conductors between sets of input/output current pool terminals on a plurality of electrode boards of like polarities.

3. A charge/discharge device according to claim 1, wherein low impedance current pool conductive structure includes interconnect pieces or bars of chosen geometry and material incorporated additionally between a plurality of serially parallelly connected conductors on input/output current pool terminals on sets of electrode boards of dissimilar polarities.

4. A charge/discharge device according to claim 1, whereof the design in respect of an improvement of the positive or negative exterior of the electrode board on both sides of the independently installed electrode tank is thus: having one or more piece of paralleled positive electrode board and as matched thereto, one or more piece of paralleled negative electrode board, set in individual electrode tanks to constitute individual electrode pairs, then having a flat plate form current pool conductor assembly of chosen material and made to specified thickness installed between respective current pool terminals on the of positive or negative electrode board on both sides of each individual electrode tank, so that it is made that the impedance prevalent way between the current pool terminals on the periphery of the external positive or negative electrode board is inferior to that impedance prevailing across the normal electrode surface duly applied with one layer of chemically active material in lattice configurations on the same electrode board.

5. A charge/discharge device according to claim 1, whereof the exterior of the external electrode board in respective individual electrode tank is processed into a current pool conductor in the form of a plank lamina or thickened lamina of uniform elements or non-uniform elements processed to present a slope.

6. A charge/discharge device according to claim 1, whereof the outside of the positive or negative electrode board on both sides of the individual present in the independently installed electrode tank, between respective current pool terminals, is processed straight into a webform conductor assembly of chosen thickness.

7. A charge/discharge device according to claim 1, whereof in the individual electrode pairs formed in the independently installed electrode tank, between the current pool terminals outside the positive or negative polarity electrode board on both sides, pieces or webform or stripe form current pool conductor assembly are interconnected by soldering, welding, riveting, screw coupling, prestressed bonding, internal burial, laying or otherwise technique, in order that the impedance prevailing between the current pool terminals on the perimeter of the externally provided positive or negative polarity electrode boards be controlled inferior to the impedance on the normal electrode surface on the other side of the same electrode board that is applied with a lattice work of chemically active coating.

8. A charge/discharge device according to claim 1, whereof the said electrode board with plate form terminals on the outside is good for connection to two or more than two independent electrode tanks, and hence good for like polarity on like polarity paralleling or opposite polarity serial connection under the same voltage specifications.

9. A charge/discharge device according to claim 1, whereof on that side of the externally provided plate-form terminal electrode board meant to couple with current pool terminals coming from other electrode tanks may be mounted two or more than two current pool terminals to thereby account for multiple coupling possibilities so that impedance is lowered in the long run.

10. A charge/discharge device according to claim 1, whereof the current conductor assembly outside the positive or negative electrode board on both sides of the individual electrode tank in particular, are provided two current pool terminals to accommodate serial or parallel combination with each electrode tank where multiple sets of electrode tanks are deployed for application.

11. A charge/discharge device according to claim 1, whereof with a view to further reduce the impedance on the part of both the current pool terminal and of the electrode board, a feasible approach is to process the current pool terminal trapezoidal extending outwardly, such that the wider base of the trapezoidal current pool terminal is coupled to the electrode board, whereby the internal impedance on the terminal, output or input, of the electrode board, is duly reduced;

examples of application of the aforementioned trapezoidal current pool terminal and electrode boards include: normal electrode boards with both sides applied with latticed chemically active coating, two or more than two outputting or inputting current pool terminal on the outside of the positive or negative polarity electrode board on both sides of each electrode tank, possible for mounting on one side or more sides of the electrode board or the positive or negative electrode board, or for one or more current pool terminal to be installed on two or more sides of the electrode board or of the positive or negative polarity electrode board.

12. A charge/discharge device according to claim 1, whereof two trapezoidal current pool terminals are included in the middle of one external side of the positive or negative electrode board on both sides of at least one said individually installed electrode tank, to make a correspondent positive or negative electrode pair with the electrode board.

13. A charge/discharge device according to claim 1, whereof trapezoidal current pool terminals are provided on both sides of the exterior of the positive or negative electrode board on both sides of each individual electrode tank, to form electrode pair with electrode board symmetrically.

14. A charge/discharge device according to claim 1, whereof on either of both external sides of the positive or negative electrode board on both sides of at least one said individual electrode tank are installed two trapezoidal current pool terminals, extending outwardly, characterized in that a dimensional differential exists between the hunch peak of current pool terminals on the same sides of the trapezoid and the edges on both sides of the electrode board so that once an electrode pair is produced by superposing the backsides of the two similarly configured electrode boards, interwoven superposition is made involving the positive/negative polarity electrodes of adjacent electrode boards, with current pool terminals intercrossing but not intervening each other, so as to facilitate interactive coupling, with better current pooling effects realized on the basal area of the wider trapezoid.

15. A charge/discharge device according to claim 1, whereof three externally extending trapezoidal current pool terminals are installed on each external side of the positive or negative polarity electrode board on both sides of at least one said electrode tank, characterized in that a dimensional differential exists between the hunch peak of current pool terminals on the same side of the trapezoid and the edges on both sides of the electrode board, so that once an electrode pair is produced by superposing the backsides of the two similarly configured electrode boards, interwoven superposition is made involving the positive/negative polarity electrodes of adjacent electrode boards, with current pool terminals intercrossing but not intervening each other, so as to facilitate interactive coupling, with better current pooling effects realized on the basal area of the wider trapezoid.

16. A charge/discharge device according to claim 1, whereof an outwardly extending trapezoidal current pool terminal are installed on two opposite sides of a quadrilateral positive or negative electrode board on both sides of at least one said individually installed electrode tank, characterized in that a dimensional differential is maintained between the hunch peak of current pool terminals on the same sides of the trapezoid and the edges on both sides of the electrode board so that once an electrode pair is formed by superposing the backsides of the two similarly configured electrode boards, interwoven super-positions is made involving the positive/negative polarity electrodes of adjacent electrode boards, with current pool terminals intercrossing but not intervening each other, so as to facilitate interactive coupling, with better current pooling effects realized on the basal area of the wider trapezoid.

17. A charge/discharge device according to claim 1, whereof two outwardly extending trapezoidal current pool terminals are installed on two opposite sides of a quadrilateral positive or negative electrode board on both sides of at least one said individually installed electrode tank, characterized in that a dimensional differential is maintained between the hunch peak of current pool terminals on the same sides of the trapezoid and the edges on both sides of the electrode board so that once an electrode pair is formed by superposing the backsides of the two similarly configured electrode boards, interwoven super-positions is made involving the positive/negative polarity electrodes of adjacent electrode boards, with current pool terminals intercrossing but not intervening each other, so as to facilitate interactive coupling, with better current pooling effects realized on the basal area of the wider trapezoid.

18. A charge/discharge device according to claim 1, whereof three outwardly extending trapezoidal current pool terminals are installed on two opposite sides of a quadrilateral positive or negative electrode board on both sides of at least one said individually installed electrode tank, characterized in that a dimensional differential is maintained between the hunch peak of current pool terminals on the same sides of the trapezoid and the edges on both sides of the electrode board so that once an electrode pair is created by superposing the backsides of the two similarly arrayed electrode boards, interwoven superposition is made involving the positive/negative polarity electrodes of adjacent electrode boards, with current pool terminals intercrossing but not intervening each other, so as to facilitate interactive coupling, with better current pooling effects realized on the basal area of the wider trapezoid.

19. A charge/discharge device according to claim 1, whereof an outwardly extending trapezoidal current pool terminal on two opposite sides of a quadrilateral positive or negative electrode board on both sides of at least one said individually installed electrode tank, characterized in that a dimensional differential is maintained between the hunch peak of current pool terminals on the same sides of the trapezoid and the edges on both sides of the electrode board so that once an electrode pair is created by superposing the backsides of the two similarly configured electrode boards, interwoven superposition is made involving the positive/ negative polarity electrodes of adjacent electrode boards, with current pool terminals intercrossing but not interfering each other, so as to facilitate interactive coupling, with better current pooling effects realized on the basal area of the wider trapezoid.

20. A charge/discharge device according to claim 1, whereof two outwardly extending trapezoidal current pool terminals are installed on two opposite sides of a quadrilateral positive or negative electrode board on both sides of at least one said individually installed electrode tank, characterized in that a dimensional differential is maintained between the hunch back of current pool terminals on the same sides of the trapezoid and the edges on both sides of the electrode board so that once an electrode pair is created by superposing the backsides of the two similarly configured electrode boards, interwoven superposition is made involving the positive/negative polarity electrodes of adjacent electrode boards, with current pool terminals intercrossing but not interfering with each other, so as to facilitate interactive coupling, with better current pooling effects realized on the basal area of the wider trapezoid.

21. A charge/discharge device according to claim 1, whereof in its application to quadrilateral or nearly quadrilateral electrode boards, apart from the provision of current pool terminals on two or four sides, it is also feasible to provide current pool terminals on three sides of the electrode board too, and the configuration of said electrode board is not restricted to a quadrilateral only, indeed it can instead take the form of a circle, a near circle, an ellipse, a near ellipse, a triangle, a polylateral, including without limitation: triangle, quadrilateral, quintuple lateral, hexagon, septuple lateral, octuple lateral, with each electrode board furnished with two or more than two current pool terminals so that each electrode board is equipped with two or more than two current pooling loops.

22. A charge/discharge device according to claim 1, wherein low impedance current pool conductive structure includes current pool terminals for input/output purposes secured by soldering, welding, riveting, screwing, prestressing technique or by burial, inlay or otherwise means among themselves, established outside the positive or negative polarity electrode boards on both sides of the electrode tank, led to correspondent terminals on the master charge/ discharge assembly, in plate or strip or web form to facilitate pooling of incoming/outgoing currents, being a low impedance conductive assembly of a chosen geometry or otherwise materials.

23. A charge/discharge device according to claim 1, whereof apart from the input/output current pool terminals on the positive, negative electrode boards on both sides of each electrode tank which, as required, may be installed singly or plurally, on one side or on more sides, all the other electrode boards can be structured such that one or more current pool terminal individually extending outwards are installed on two or more than two sides on individual electrode boards; or such that two or more than two current pool terminals are all installed on just one side or more sides, to enable multiple current path paralleling converged on electrode boards of like polarities, or instead multiple path series connection between electrode boards of dissimilar polarities; structurally, the current pool terminals are made of hardcore or hollow-set tubular rod conductors bearing circular, square, otherwise geometric configurations, to be mounted into position across the conductive penetration holes present between the electrode boards of the charge/ discharge device, so that parallel connection is made possible with electrode boards of like polarities, or alternatively serial connection is made among electrode boards of dissimilar polarities, so still so that a combined serial/parallel connection is consummated: further parallel execution is extended to encompass the current pool terminals, being conductor themselves, such that they, of identical voltage specifications and on electrode boards of like polarities, from the same or different electrode tanks, the extension goes to series connection too, by interconnecting current pool terminals between electrode boards of different polarities from dissimilar electrode tanks serially and hence compound serial/parallel combination is made possible forthwith, and that complemented with the effort of a low impedance structure whereby input/output current pool terminals are combined to facilitate pooling of incoming/outgoing currents, on the exterior of positive or negative electrode boards on both sides of individually installed electrode tanks, or alternatively supplemented with parallel run current pool conductors in an effort to reduce impedance to the confluent incoming or outgoing currents.

24. A charge/discharge device according to claim 1, wherein low impedance current pool conductive structure includes plate or strip or web form structure for connection to respective output/input current pool terminals of which individual electrode tanks are installed outside the positive or negative polarity electrode board, on both sides of the electrode tank, or other low impedance current pool conductor assembly made of chosen materials in otherwise geometrical configurations.

25. A charge/discharge device according to claim 1, wherein low impedance current pool conductive structure includes plate or strip or web form structure for connection to respective output/input current pool terminals of which individual electrode tanks are installed outside the positive or negative polarity electrode boards on both sides of the electrode tank, with areas between consecutive output current pool terminals interconnected by welding, soldering, riveting or screwing technique, or prestressed, or burial or inlay or otherwise means, to facilitate pooling of input/output currents, or other low impedance current pool conductor assembly of chosen material in otherwise geometrical configuration.

26. A charge/discharge device according to claim 1, wherein low impedance current pool conductive structure includes plate or strip or web form structure with output/input current pool terminals associated with the overall storage/discharging device being installed outside the positive or negative polarity electrode board on both sides of the electrode tank, to facilitate transiting of incoming/outgoing current pool, or low impedance current pool conductor assembly of chosen material but otherwise geometrical configuration, said plate form encompassing thickened board of uniform or non-uniform, tilted sheets.

* * * * *